July 19, 1960
W. R. POLANIN
2,945,562
TREAD BRAKE ARRANGEMENT
Filed Oct. 24, 1955
4 Sheets-Sheet 1
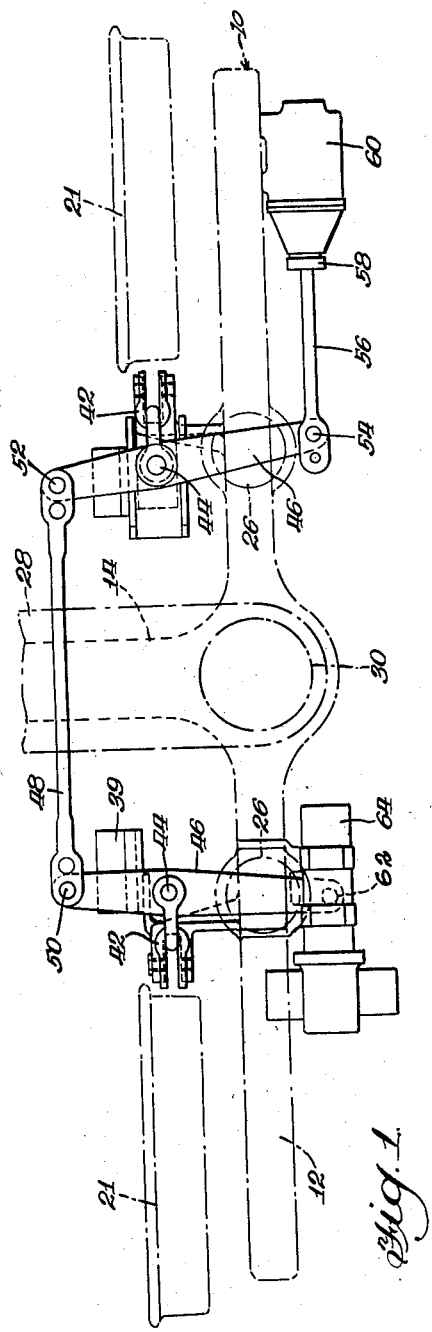
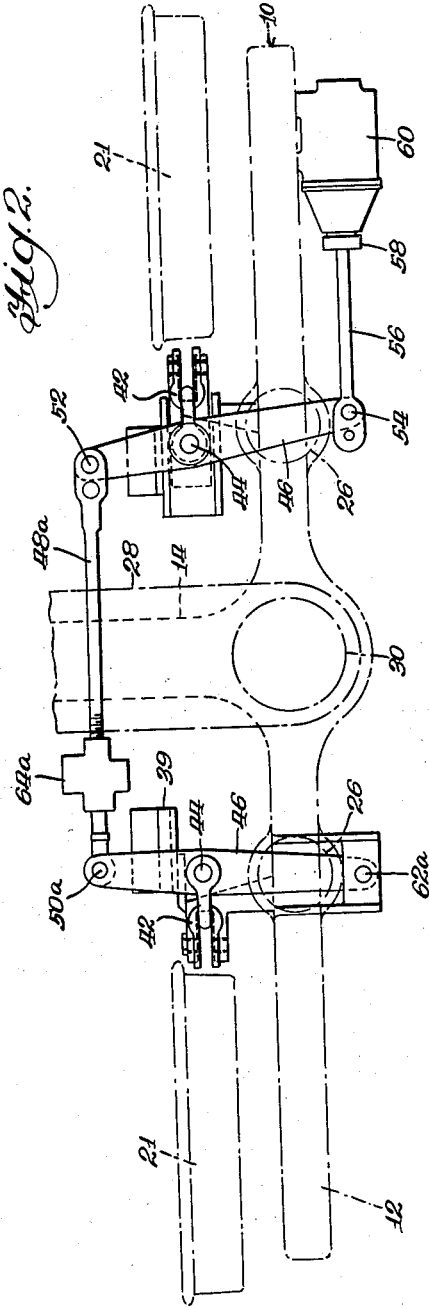
INVENTOR.
Walter R. Polanin
BY Walter L. Schlegel, Jr.
Atty.
Witness:
Richard W. Carpenter July 19, 1960
W. R. POLANIN
2,945,562
TREAD BRAKE ARRANGEMENT
Filed Oct. 24, 1955
4 Sheets-Sheet 2
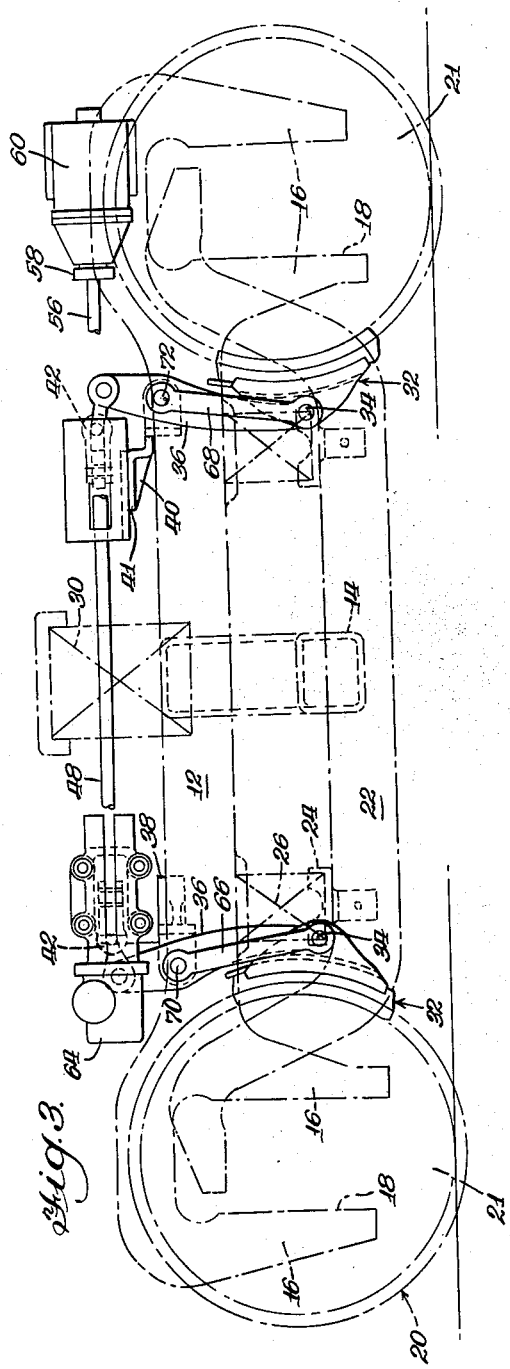
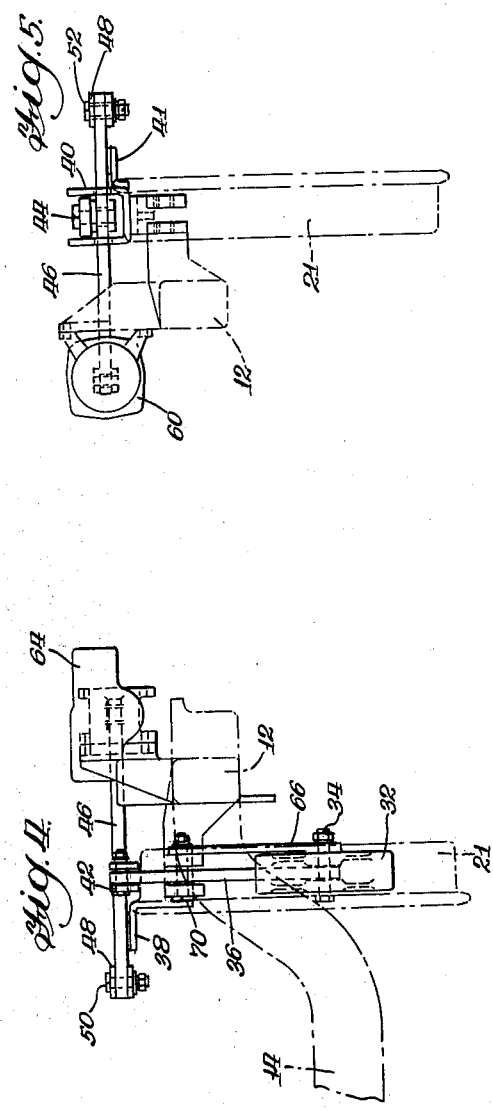
INVENTOR.
Walter R. Polanin
BY Walter L. Schlegel, Jr.
Atty.
Witness:
Richard W. Carpenter

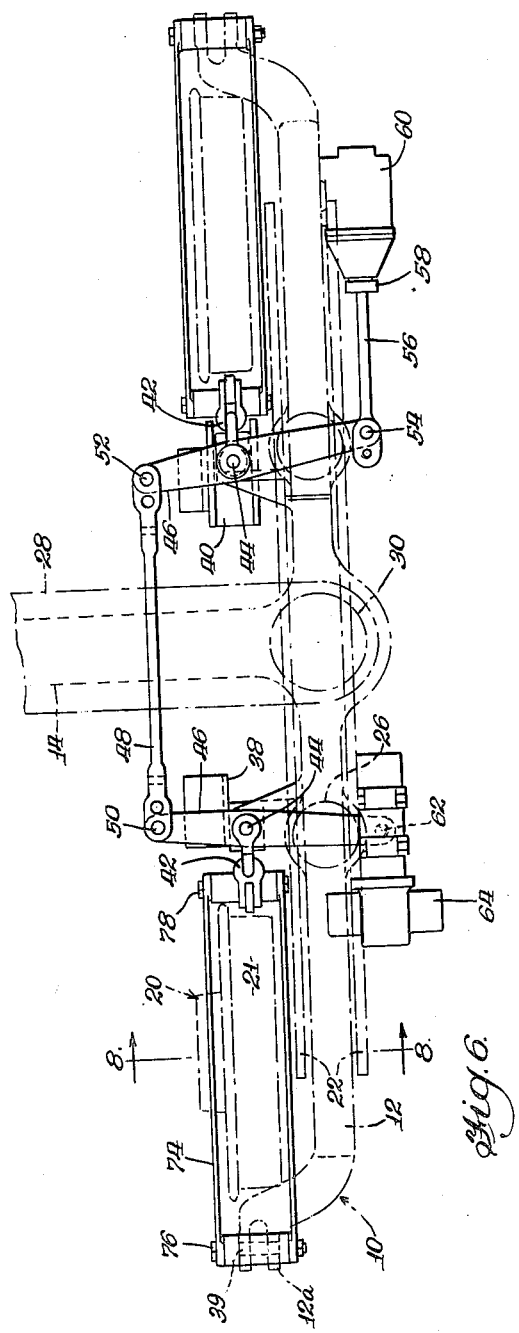

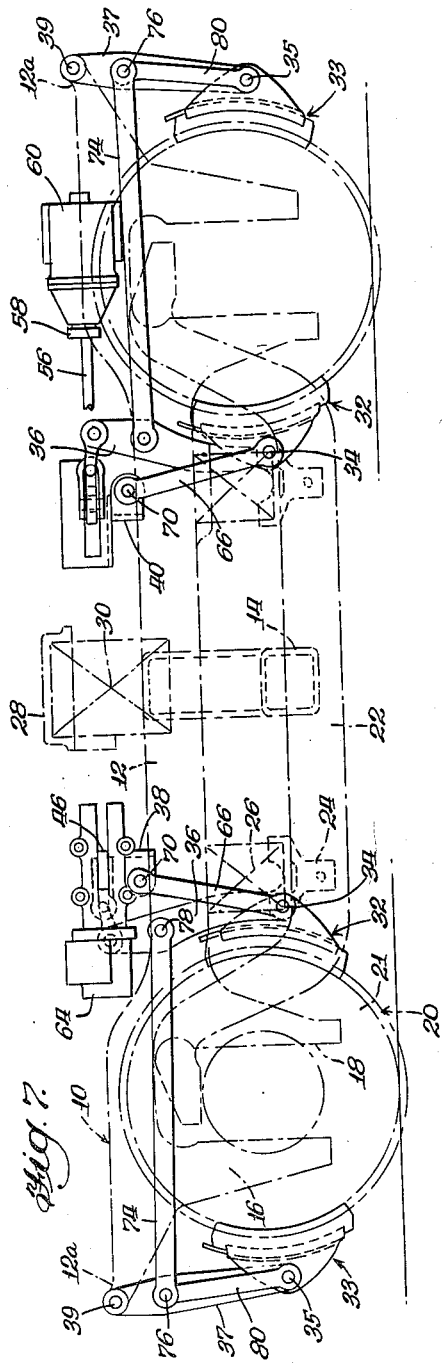
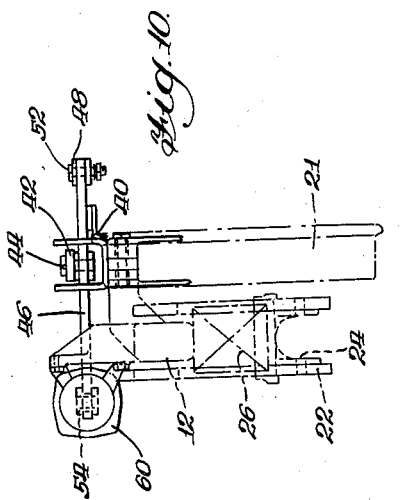
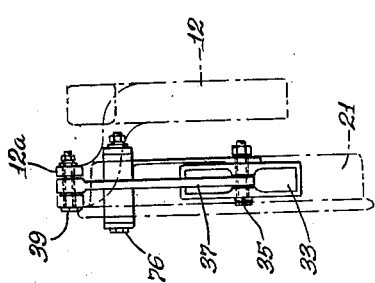

2,945,562

United States Patent Office

Patented July 19, 1960

2,945,562

TREAD BRAKE ARRANGEMENT

Walter R. Polanin, Chicago, Ill., assignor to American Steel Foundries, Chicago, Ill., a corporation of New Jersey Filed Oct. 24, 1955, Ser. No. 542,435

3 Claims. (Cl. 188—52)

This invention relates to railway car truck brake arrangements and more particularly to that type of brake arrangement known in the art as a tread brake arrangement.

The invention comprehends an arrangement especially adapted for use in high speed light weight railway car trucks.

A principal object of the invention is to provide a highly compact and efficient brake linkage for use in a light weight high speed railway car truck.

Another object of the invention is the provision of the linkage arrangement readily adapted for use with either a clasp brake or a single shoe brake system.

Another object of the invention is the provision of an arrangement, wherein the actuating levers associated with the brake levers are interconnected at their inboard ends by a tension or pull rod.

Another object of the invention is the provision of an arrangement, wherein the slack adjusting means may be positioned at either end of one of the actuating levers where the other actuating lever is associated with the power means.

These and other objects of the invention will be apparent from an examination of the following description and drawings, wherein:

Figure 1 is a top plan view of a portion of a railway car truck embodying one form of my invention;

Figure 2 is a view similar to Figure 1 but illustrating a modified form of my invention;

Figure 3 is a side elevational view of the structure shown in Figure 1;

Figure 4 is an end elevational view of the structure shown in Figure 1, as seen from the left;

Figure 5 is an end elevational view of the structure shown in Figure 1, as seen from the right;

Figure 6 is a view similar to Figure 1 but illustrating my invention as applied to another type of brake arrangement;

Figure 7 is a side elevational view of the structure illustrated in Figure 6;

Figure 8 is an end elevational view partially shown in section taken along the line 8—8 of Figure 6;

Figure 9 is an end elevational view of the structure shown in Figure 6 as seen from the left, and Figure 10 is an end elevational view of the structure shown in Figure 6 as seen from the right.

It will be understood that certain elements have been intentionally omitted from certain views where they are more clearly illustrated in other views.

Referring now to the drawings and particularly to Figures 1 and 2 for a better understanding of the invention, it will be seen that the truck comprises a relatively light weight frame indicated generally at 10 having spaced side members 12 interconnected by a transverse member or transom 14 which is preferably formed integrally therewith.

The side members, only one of which is shown, are provided at each end thereof with pedestal jaws 16 which define journal openings 18 therebetween. The frame may be supported in the usual manner by spaced wheel and axle assembles 20, the journal ends (not shown) of which are received in journal openings 18 of the side members. The journal means at each end of the truck are interconnected by equalizer bars 22 having spring seats 24 for mounting load springs 26 which resiliently support the side members 12.

A car body (not shown) may be mounted in the usual manner on a bolster 28 which is supported at either end by springs 30 from the side member 12.

Referring again to Figure 3, it will be seen that a pair of brake shoe assemblies 32 are disposed adjacent the inner sides of wheels 21 and are pivoted by pins 34 to the lower extremities of dead brake levers 36. The right and left brake levers are preferably fulcrumed intermediate their ends to brackets 38 and 40, respectively, which are rigidly secured to the side member 12 of the frame. The upper extremity of each brake lever has secured thereto a link or clevis 42 which is in turn pivoted by pin 44 to a generally horizontal actuating lever 46 intermediate the ends of the actuating lever. It will be noted that the frame brackets 38 and 40 are also provided with inboardly extending horizontal shelves 39 and 41 which offer sliding support for the left and right actuating levers, respectively.

Referring again to Figure 1, it will be seen that the inboard ends of the left and right actuating levers are interconnected by a pull rod 48 pivoted to the levers by pins 50 and 52, respectively. The outboard end of the right hand actuating lever, as seen in Figure 1, is pivoted by pin 54 to rod 56 extending from piston 58 of power cylinder 60 which is mounted on the side frame 12. The outboard end of the left hand actuating lever is pivoted by pin 62 to slack adjusting device 64 which is also mounted on the outboard side of the side member 12.

The brake shoe assemblies may be additionally supported by left and right brake hangers 66 and 68 pivoted at their lower ends to the brake shoe assemblies by pins 34 and at their upper ends to frame brackets 38 and 40 by pins 70 and 72, respectively.

Referring now to Figure 2, it will be seen that the structure shown herein is the same as that of Figure 1 except that the outboard extremity of the left hand actuating lever 46 is fulcrumed by pin 62a to the frame itself, wherein the slack adjusting device 64a is pivoted at 50a to the inboard extremity of the actuating lever and is threadably connected to pull rod 48a.

To describe the operation of the device and referring again to Figure 1, it will be understood that as the outboard end of the right had actuating lever is moved to the left by the power cylinder piston rod, the lever rotates clockwise about pin 52 causing right hand brake lever 36 to rotate counterclockwise, as seen in Figure 3, about pin 72 bringing the right hand brake shoe assembly into engagement with the wheel. As the right hand brake shoe assembly engages the wheel, the pivot point of right hand actuating lever 46 shifts from pin 52 to pin 44 and the lever continues to rotate clockwise urging pull rod 48 to the right, as seen in Figure 1. As the pull rod moves to the right, it causes the left hand actuating lever 46 to rotate clockwise about pin 62 thereby moving the upper end of left hand brake lever 46 and causing the brake lever to rotate clockwise about pin 70 bringing the left hand brake shoe assembly into engagement with the related wheel.

Although the above described embodiment, as shown in Figures 1 through 5 is illustrated with a single shoe brake arrangement, the novel linkage is equally suitable for a clasp brake arrangement as illustrated in Figures 6 through 10 of the drawings. The basic arrangement of the embodiment illustrated in Figures 6 through 10 is similar to the above described embodiment except that additional outer brake shoe assemblies 33 are provided and pivotally connected by pins 35 to the lower extremities of dead outer brake levers 37 which have their upper ends pivoted by pins 39 to side member end brackets 12a. Brake straps 74 serve to interconnect the inner and outer brake levers associated with each wheel, and are pivoted to the outer and inner brake levers by pins 76 and 78, respectively. Additional support is afforded for each outer brake shoe assembly by an outer brake hanger 80 pivoted at its upper and lower extremities to the straps and assemblies by pins 76 and 35, respectively.

The operation of the clasp brake arrangement is similar to that described for the single shoe arrangement except that as each inner brake shoe assembly is brought into engagement with the wheel, its corresponding outer brake shoe assembly is brought into engagement with the wheel by means of the straps 74 and the outer brake lever 37.

It will also be noted that the clasp brake arrangement illustrated in Figures 6 through 10 may be provided with a slack adjusting device located in either position as illustrated in Figure 1 or 2.

I claim:

1. In a brake arrangement for a railway car truck comprising a frame supported by a pair of spaced wheel and axle assemblies disposed closely adjacent each other with rotatable friction surfaces thereon, the combination of: a power cylinder and a slack adjusting device mounted on the frame outboardly thereof and spaced from each other, brake means positioned adjacent and engageable with said friction surfaces, brake levers positioned intermediate said assemblies and connected at their lower extremities to said brake means, means to pivot said levers intermediate their respective extremities, actuating levers disposed intermediate said assemblies and operatively connected intermediate their extremities to the upper extremities of the respective brake levers, a pull rod having its opposite ends pivotally connected directly to the inboard extremities of the respective actuating levers, the outboard extremities of said actuating levers being directly connected to the slack adjusting device and power cylinder, respectively.

2. In a brake arrangement for a railway car truck comprising a frame supported by a pair of spaced wheel and axle assemblies disposed closely adjacent each other with rotatable friction surfaces thereon, the combination of: a power cylinder supported by the frame, brake means positioned adjacent and engageable with said friction surfaces, brake levers connected to said brake means, means to fulcrum said brake levers for rotative movement, actuating levers operatively connected intermediate their ends to the respective brake levers, a pull rod directly interconnecting the inboard ends of the actuating levers, the outboard end of one of the actuating levers being directly connected to the power cylinder and means to fulcrum the outboard end of the other actuating lever to the frame.

3. A brake arrangement according to claim 2, wherein the means to fulcrum said other actuating lever includes a slack adjusting device.

References Cited in the file of this patent

UNITED STATES PATENTS

| | | |
|---|---|---|
| 2,071,963 | Baselt | Feb. 23, 1937 |
| 2,280,754 | Flesch | Apr. 21, 1942 |